United States Patent
Koops et al.

(10) Patent No.: US 6,909,104 B1
(45) Date of Patent: Jun. 21, 2005

(54) MINIATURIZED TERAHERTZ RADIATION SOURCE

(75) Inventors: Hans W. P. Koops, Ober-Ramstadt (DE); Tobias Bauer, Frankfurt/M. (DE); Wolfgang Elsässer, Seeheim-Jugenheim (DE); Filip Floreani, Darmstadt (DE); Hartmut Roskos, Frankfurt/M. (DE)

(73) Assignee: NaWoTec GmbH, Rossdorf (DE)

( * ) Notice: Subject to any disclaimer, the term of this patent is extended or adjusted under 35 U.S.C. 154(b) by 0 days.

(21) Appl. No.: 09/980,250

(22) PCT Filed: May 10, 2000

(86) PCT No.: PCT/EP00/04167

§ 371 (c)(1),
(2), (4) Date: May 24, 2002

(87) PCT Pub. No.: WO00/72413

PCT Pub. Date: Nov. 30, 2000

(30) Foreign Application Priority Data

May 25, 1999 (DE) .......................... 199 23 614
Feb. 12, 2000 (DE) .......................... 100 06 361

(51) Int. Cl.$^7$ ................................ G02F 1/31
(52) U.S. Cl. .................. 250/493.1; 250/492.24; 250/494.4
(58) Field of Search .................. 250/493.1, 492.24, 250/494.4, 492.22

(56) References Cited

U.S. PATENT DOCUMENTS 3,586,899 A    6/1971 Fleisher
4,286,230 A  *  8/1981 Morrison et al. ............. 331/79

(Continued)

FOREIGN PATENT DOCUMENTS

DE    196 09 234    9/1997
WO    WO 87/01873   3/1987
WO    WO 98/21788   5/1998

OTHER PUBLICATIONS

*Schoessler C et al., "Nanostructured integrated electron source", Silicon Heterostructures: From Physics to Devices, Barga, Italy, Sep. 16–19, 1997, vol. 16, No. 2, pp. 862–865, Journal of Vacuum Science & Technology (Microelectronics and Nanometer Structures), Mar.–Apr. 1998, AIP for American Vacuum Soc. USA.

(Continued)

*Primary Examiner*—Nikita Wells
*Assistant Examiner*—Anthony Quash
(74) *Attorney, Agent, or Firm*—Woodling, Krost and Rust

(57) ABSTRACT

A miniaturized terahertz radiation source based on the Smith-Purcell effect is provided, in which, from a focused electron source, a high-energy bundle of electrons is transmitted at a defined distance over a reflection diffraction grating composed of transversely disposed grating rods, so that, in response to oscillating image charges, electromagnetic waves of one wavelength are emitted, the wavelength being adjustable as a function of the periodicity of the lines and of the electron velocity. The elements of the radiation source, such as field emitter (1), electrostatic lens (4), beam deflector (5), grating (7) of metal, and a second anode (8), are integrated on a semiconductor chip using additive nanolithographic methods. The field electron source is constructed to project, as a wire, out of the surface, using additive nanolithography, and is made of readily conductive material having stabilizing series resistance. The wire is constructed, using computer-controlled deposition lithography, in a straight or curved, free-standing design. In its surface area, the base material bears a conductor structure for the electrical terminals and connections (2), including controllable voltage sources (3) for supplying the field emitter tips (1), lens (4), and control electrodes (5, 8). The terahertz radiation source is designed to be a powerful component that is available in modular form and is usable in any spatial situation.

23 Claims, 3 Drawing Sheets

U.S. PATENT DOCUMENTS

| | | | |
|---|---|---|---|
| 4,571,726 A | * 2/1986 | Wortman et al. | 372/2 |
| 4,727,550 A | 2/1988 | Chang et al. | |
| 4,956,574 A | * 9/1990 | Kane | 313/306 |
| 5,263,043 A | 11/1993 | Walsh | |
| 5,268,693 A | 12/1993 | Walsh | |
| 5,790,585 A | * 8/1998 | Walsh | 372/102 |

OTHER PUBLICATIONS

\*\*JP 0004199885, Abstracts of Japan, Mitsubishi Electric Corp., "Semiconductor Light Emitting Device", Jul. 21, 1992.

\* cited by examiner

MINIATURIZED TERAHERTZ RADIATION SOURCE

FIELD OF THE INVENTION

The present invention relates to a miniaturized terahertz radiation source that is based on the Smith Purcell effect.

BACKGROUND INFORMATION

At certain frequencies in the far infrared range, coherent radiation may be generated, for example, by molecular lasers which are pumped by $CO_2$ lasers. Many of the frequencies and wavelengths of importance to the spectroscopy of molecules and solid bodies may be within the wavelength range extending from 3 mm to 30 $\mu$m (from 100 gigahertz to 10 terahertz). The use of a microradiation source, which may be tunable within the wavelength range and implemented on a semiconductor chip of a wafer for this range of terahertz radiation and which exhibits sufficient power output within the range of between 1 $\mu$W and 1 W, may be substantially significant from a technical standpoint for spectroscopic applications in all areas of environmental protection, analytics, and in material characterization in medicine and biology, as well as in chemistry and physics. Another way to generate coherent radiation in the far infrared range is based on the so-called Smith Purcell effect. It provides for generating radiation similar to the method known from the "free electron laser". Macroscopic electron sources and diffraction gratings having a 100 to 300 $\mu$m period may be used to generate a coherent radiation field of polarized radiation having up to 1 $\mu$W power.

The reference "Intensity of Smith-Purcell Radiation in the Relativistic Regime", J. Walsh, K. Woods, S. Yeager, Department of Physics and Astronomy, Dartmouth College, Hanover, N.H. 03755, U.S., pages 277–279, discusses the theory of such Smith-Purcell radiation sources and, additionally, gives experimental results. The reference "A New Source of THz-FIR Radiation" in LEOS NEWSLETTER, February, 1999 by J. E. Walsh, J. H. Brownell, J. C. Swartz, Department of Physics and Astronomy, Dartmouth College, Hanover, N.H. 03755-3528 and M. F. Kimmitt, Department of Physics, Essex University, Colchester, UK, Jan. 7, 1999, pages 11–14, discusses the design and mode of operation of a radiation source in the terahertz region. It may be that these terahertz radiation sources are perfectly efficient, but they do not yet suffice for many analytical applications, and they are not yet miniaturized to a sufficient degree.

SUMMARY OF THE INVENTION

The present invention is directed to providing a free electron an laser, which is miniaturized further extent, and may be a more powerful source for analytical applications.

Exemplary embodiments and/or exemplary methods of the present invention are directed to providing a miniaturized terahertz radiation source, which is based on the Smith-Purcell effect, on a semiconductor chip, using available additive nanolithography, which may function as a miniaturized, free electron laser, be substantially more powerful than existing such radiation sources, and facilitate a substantially broader field of application, in particular for analytical applications.

Exemplary embodiments and/or exemplary methods of the present invention are further directed to using additive nanolithography to produce such miniaturized terahertz radiation sources, such that field electron sources having a high directional beam value may be produced. By employing additional miniaturized, electron-optical elements, for example, accelerator grids, focusing lenses, beam deflectors, and free-standing metallic rods, the components may now be assembled to construct a miniaturized, free electron laser on a surface of a few 100 $\mu m^2$ through 10 $mm^2$. In this context, the electron source has the characteristic of emitting electrons at 30 volts, which then possess an energy of 30 electron volts. In exemplary embodiments and/or exemplary methods of the present invention, using nanolithography, the second characteristic component of focusing and beam guidance of the electron beam in parallel to the surface at a finite distance to the third component, a metallic grating, may be controlled. The vertical position or height of the beam over the metallic grating may likewise be adjusted by applying deflection voltages to micro-miniaturized deflecting plates or wire lenses. The diffraction grating, to the extent that is possible, up to one millimeter long, a reflection diffraction grating having a grating constant in the range of 0.1 mm to 0.1 $\mu$m, may be produced using conventional lithography in the manufacturing of electrical connection structures for supplying the field electron source, i.e., be defined by electron-beam lithography at the highest resolutions.

In exemplary embodiments and/or exemplary methods of the present invention, a high-resolution double-resist technique and lift-off may be used. The exemplary embodiments and/or exemplary methods may employ new types of technologies to integrate the electron source, the beam guidance, and the generation of the far-infrared radiation by the flight of the fast electrons across the diffraction grating. In this context, given standard sources of up to approximately 20,000 volts accelerating voltage and an electron beam of 20 $\mu$m diameter over a grating of 100 to 300 $\mu$m period, an infrared radiation in the far infrared is achieved between 100 $\mu$m and one millimeter wavelength. This radiation may be produced by the image charge, or image potential energy, which oscillates in response to the electrons flying past the surface profile of the grating. The changing spacing between the charges produces an oscillating dipole, which may oscillate in coherent fashion along the grating. This ensues due to the Coulomb interaction of the individual charges on the wires. In this context, the entire electrical field may oscillate coherently in conformance with the individual charges of the rods. In this manner, electromagnetic radiation is emitted coherently along the entire grating. Its energy transfer from the electron beam to the electromagnetic radiation takes place virtually losslessly. The polarization may require a certain displacement current and, thus, a certain power, but this may be entirely drawn directly from the beam. In exemplary embodiments and/or exemplary methods of the present invention, the oscillating dipole charge chain may be produced in this manner. In further exemplary embodiments and/or exemplary methods of the present invention, integration of the electron guidance on a chip, and the direct coupling to the grating having a high spatial resolution, in the manufacturing process is provided. In further exemplary embodiments and/or exemplary methods of the present invention, micro-miniaturization may allow for the use of low-energy electrons having energies of between 10 and 1000 eV. Further exemplary embodiments and/or exemplary methods are directed to generating up to 10 kV of electrons on the chip and to implement the guidance by using miniaturized electron-optical components, such as micro-lenses and deflecting elements.

In further exemplary embodiments and/or exemplary methods of the present invention, when using such high-energy electrons, radiation may also be generated for short wavelengths ranging from middle infrared to the visible spectral region. By manufacturing on a common substrate, one ensures direct coupling to the grating via the shortest distance to the source, and the manufacturing of the grating and the source on the same chip. In this manner, in further exemplary embodiments and/or exemplary methods, the path of rays of the electrode configuration, which in a conventional design, may be up to one meter, is reduced to less than 1 mm to 10 mm length. Moreover, a very highly coherent and local light source may produced, which benefits the temporal and spatial coherence of the radiation. In exemplary embodiments and/or exemplary methods of the present invention, because the entire electron path is shortened to a greater degree, it may be no longer necessary to use extra-high or high vacuum in the radiation room. It may suffice to cover the system by a window etched in silicon using a flipchip bonding technique. This window may be closed by a continuous membrane of silicon, thereby rendering possible a hollow space. The up to 10 μm high component may be easily accommodated in the hollow space. Into a silicon wafer of 250 μm thickness, one may etch windows of a few millimeter diameter, which are sealed by a membrane having a thickness of 10 μm up to 100 μm. This may render a stable mechanical encapsulation of the miniaturized component. In exemplary embodiments and/or exemplary methods of the present invention, it can also be manufactured micromechanically, in millimeter dimensions. In this context, the required vacuum is approximately 0.01 Torr. In this case, the average free path length of the electrons in this gas of reduced pressure is as large as the beam length of the miniaturized component. This can eliminate the need for a pump configuration. The component can be packaged as a ready-made, sealed element and connected. In this manner, a terahertz radiation source may be produced, i.e., a millimeter and submillimeter radiation source on a semiconductor chip. Through appropriate wave guidance, this radiation source can be linked to further applications.

DETAILED DESCRIPTION

Figure 1:
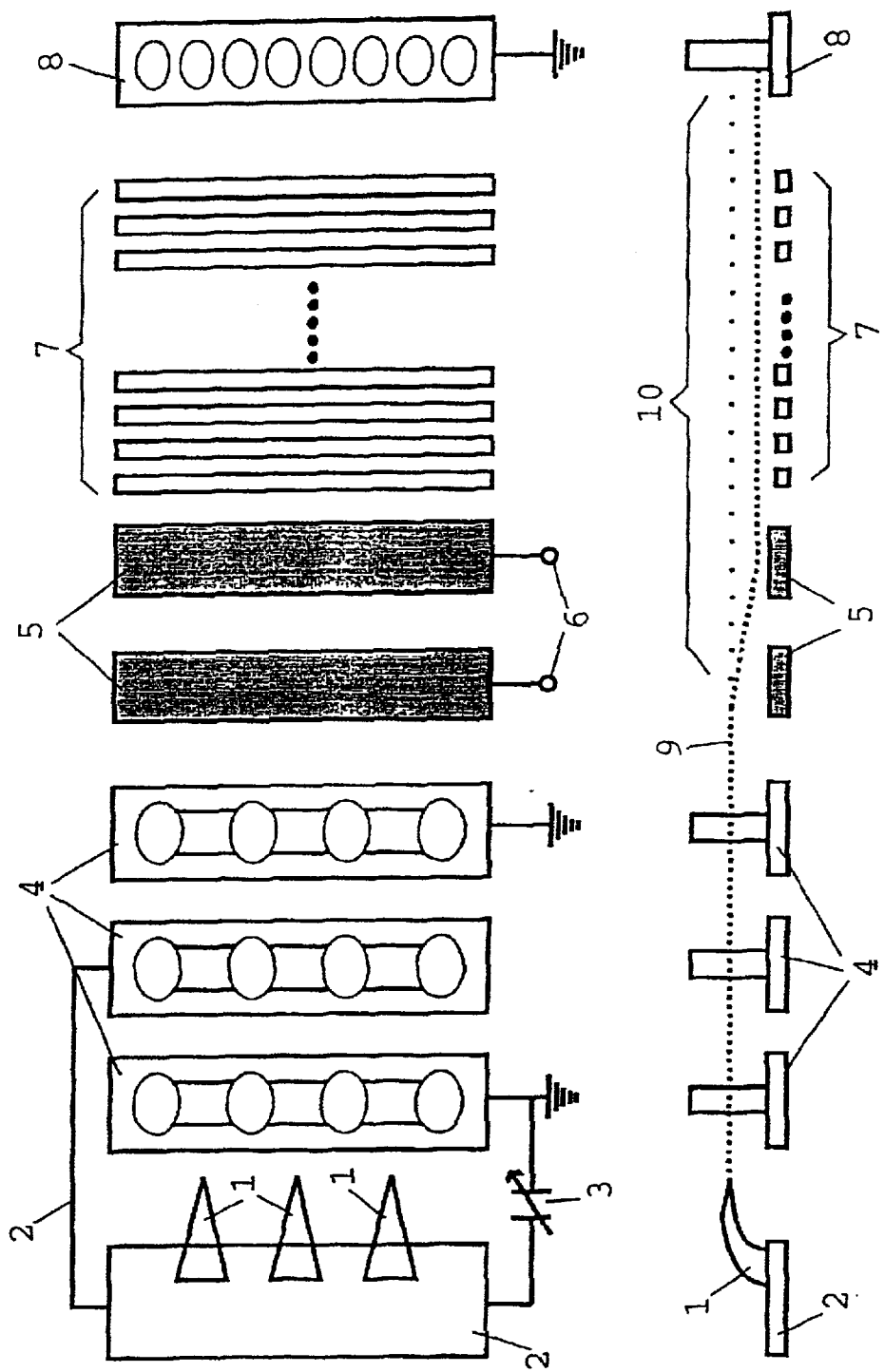
FIG. 1 shows a plan and side view of a fundamental design of a miniaturized terahertz radiation source based on the Smith Purcell effect.

FIG. 1 schematically depicts the electrode design for a miniaturized, free electron laser in a plan view and side view. The individually illustrated elements may also be produced using an available additive nanolithography method. Shown both in the plan view as well as in the side view, the individual elements of the miniaturized terahertz radiation source are illustrated in the following sequence. First, field emitter tips 1 are shown to the left. They are linked via electrical terminals or connections 2 to a controllable voltage source 3 and, on the other hand, to an electrostatic lens 4, composed here of three electrodes. The left electrode is the extractor or the first anode of the electron source. Shown in the middle are beam deflectors 5 having connections 6, to which optical and/or electron-beam lithography and a deflection voltage are applied. Beam deflector 5 is followed by a grating 7 of metal. Electron beam 9, having been deflected by beam deflector 5, passes through this grating and strikes here as an electron beam, without being deflected 10, upon a second anode 8.

Figure 2:
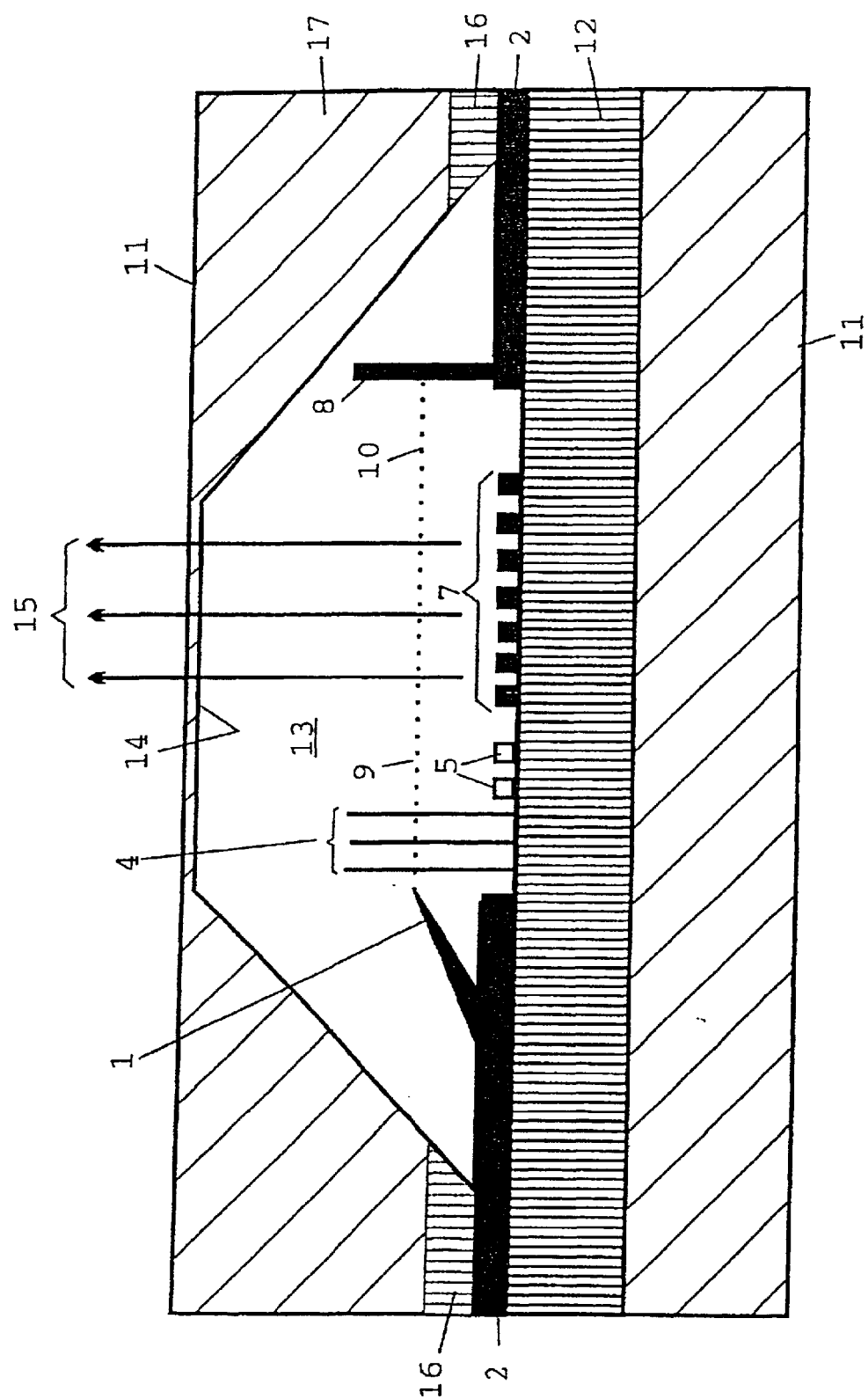
FIG. 2 shows an encapsulation having a silicon membrane structure for maintaining the necessary vacuum during operation.

FIG. 2 shows an exemplary variant of an encapsulation. This design enables the electron source, here in the form of field emitter tips 1, electrostatic lens 4 for focusing electron beam 9/10, beam deflector 5 for deflecting the beam in the horizontal and vertical direction, grating 7 of metal having an underlaid reflector to be constructed in integrated fashion, using mix-match technology employing additive nanolithography on an insulating substrate having a terahertz reflection base in the grating region, on metal conductor connection structures, which are prefabricated using electron beam or optical lithography, and to be imperviously encapsulated in a vacuum 13 using a technology which is transparent to terahertz radiation. This design enables electron beam 9 emerging from field emitter 1 to be focused through miniaturized wire lenses 4, to be directed through integrated deflecting plates 5 relatively to the position of grating 7, and to be positioned, thereby generating terahertz radiation, whose intensity and wavelength may be varied and selected. Field emitters, i.e., field emitter tips 1 are linked via an electrical terminal connection 2 to a controllable voltage source 3 and, moreover, via an electrical connection 2 to the middle electrode of electrostatic lens 4. The left electrical electrode of lens 4 is the first anode of the electron source and, together with a terminal of controllable voltage source 3, is connected to ground, as is also the electrode of electrostatic lens 4 situated on the other side of the middle electrode. The field electron source having field emitters 1 is a wire constructed, using additive nanolithography, out of readily conductive material having stabilizing series resistance, and may be designed such that electron beam 9 emerges in parallel to the surface. This means that the wire is manufactured, using a computer-controlled deposition lithography, in a straight or curved design, to end freely over the surface of the conductor path structure. The field electron source has a punctiform design. On its field emitter tips (1), a material having a low work function is deposited using additive nanolithography, so that electrons are emitted already in response to relatively low voltages.

An exemplary variant of the design provides for mounting an accelerator grid as a beam deflector 5, in the form of a free-standing electrode composed of two cylindrical rods or a standing wire ring, behind the field electron source having field emitters 1. The electrons may thus be accelerated and directed into subsequent, additionally constructed round multipole lenses and/or cylindrical lenses, so that the propagating electron beam 9 is additionally deflected over subsequent diffraction grating 7 at a homogeneous distance to the surface. The focusing and beam-guidance lenses, which are implemented by additive nanolithography on the metal connection structure produced using electron-beam lithography or optical lithography, are constructed, using this technology, to produce a diffraction grating having a length of approximately 1 mm to 1 cm, with grating periods of 0.5 to 10 μm, depending on the wavelength of the terahertz radiation to be emitted.

An exemplary variant of the design may also provide for a side-by-side configuration of a plurality of electrically isolated diffraction gratings, which may be activated by selecting various sources, enabling various emitted wavelengths to be chosen.

The radiation from electron source is retained at a constant level by a control circuit, in particular by a controllable voltage source 3, and electron beam 10 propagating over grating 7 is then picked up by a second anode 8, which is used as a collecting anode electrode.

Between the second earth electrode of electrostatic lens 4 and second anode 8, a field is applied, which may be used to alter the electron velocity along the grating. This may be used for precisely adjusting the wavelength and also for generating a frequency spectrum.

Another exemplary embodiment of the design of the miniaturized, i.e., microminiaturized terahertz radiation source, based on the Smith-Purcell effect, is shown in FIG. 2. By providing encapsulation using a silicon membrane operating the laser. The emitted laser THz radiation 15 is radiated to the outside through a membrane window 14. The radiation emitter, constructed on a chip of silicon 11 and composed of the field emission source, optics, grating and anode, is covered in this exemplary embodiment by membrane window 14, which is made of silicon 11, as may be the entire covering chip 16. The thus constructed radiation emitter may be evacuated in a vacuum system, prior to the bonding, to a pressure of $10^{-4}$, which suffices for one millimeter average free path length. The hollow space may subsequently be sealed in the vacuum by thermal bonding, without short-circuiting the voltage supply. Membrane windows 14 in covering chip 17 may be treated using reflection-reducing layers, so that a maximum transmission through window 14 is attained for the frequency range of the emitted radiation.

Further, configured underneath the grating region may be a THz radiation reflector in the form of a metal layer or arrangement of grating rods, having a defined spacing of a suitable period, of magnetic or non-magnetic materials, so THz radiation 15, which exits grating 7 in the direction of the substrate, may be sent back through the grating with the highest possible reflectance, thereby strengthening the intensity of the emitted radiation. Implementing a beam guidance over grating 7 at a defined distance can may allow variation of the intensity of the radiation source. This means that by employing deflecting element 5 before the grating, the radiated intensity may be modulated in response to the application of an alternating current voltage to this deflecting element. In this manner, the radiation may be directly generated in modulated form for spectroscopic purposes for lock-in measuring techniques. The same lock-in modulation may also be provided by modulating the extraction voltage at field emitter tip 1.

For certain applications, the voltage source may be supplemented by installing a monochromator on an overlying surface. Such a monochromator may be constituted as a nanometer structure or micrometer structure that acts on this region, so that beams generated with a different wavelength exit the radiation source in different directions. In this manner, by switching over the electron energy, which, in the electrostatic system in accordance-with -he electrostatic principle, may always yield the same focusing and, thus, constant operating conditions, radiation of different frequencies may be generated, and the radiation source may be electrically tuned for different applications.

Between focusing lens 4 and the end of grating 7, one variant provides for applying an electrical field, in which, at the end of the grating, an additional electrode is positioned, through which voltage may be applied to accelerate or decelerate the flying electrons. This makes it possible to compensate for the energy loss experienced by the electrons when flying past grating 7. Grating 7, over which electron beam 10 propagates, may be subdivided into regions which are disposed in parallel to the beam direction, in which different grating constants are implemented. The horizontal, electrostatic beam guidance, effected by electrodes positioned in parallel to grating 7 and, respectively, by a plurality of electron sources, one of which is assigned to the individual region, may allow for the emitted radiation to be implemented as radiation that is switchable in its wavelength.

The grating constant of the grating may vary transversely to the beam direction, so that the beam guidance may be varied over the grating by deflection fields or by deflecting plates, which surround the grating all around, and are positioned behind the focusing lens, such that a region having a different grating constant may be selected for emitting the wavelength of the radiation. Designing the grating as a "chirped grating", i.e., as a grating having a variable grating constant, enables the wavelength to be adjusted in continuous fashion.

The intensity of the terahertz radiation source is controlled by installing an electrostatic plate, which is transparent to THz radiation, below and above the grating, thereby enabling the intensity to be locally selected, or selected with respect to particular locations. This may be achieved by designing these electrostatic plates to include regions of different potentials, i.e., by providing separately adjustable strips.

Figure 3:
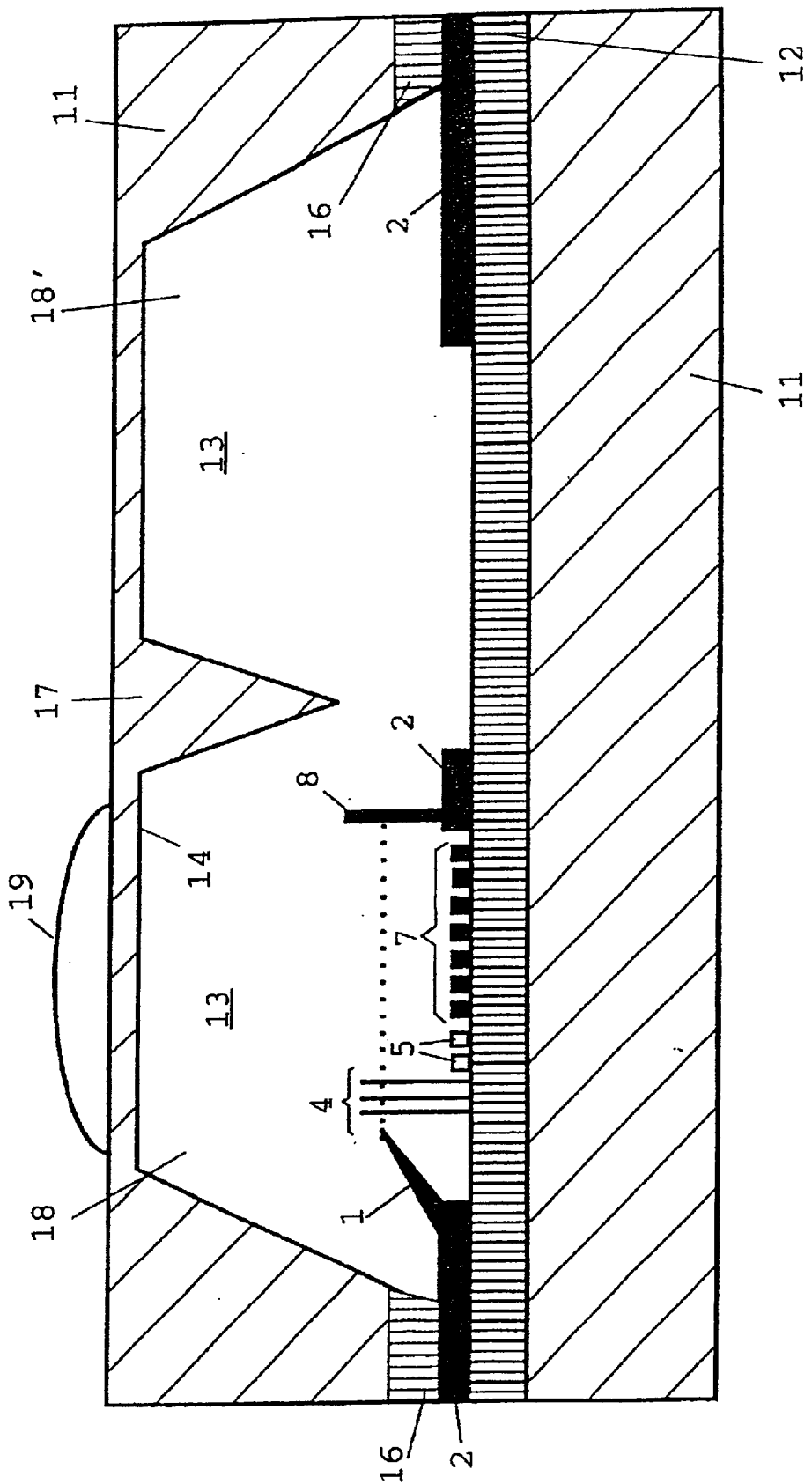
FIG. 3 shows a two-chamber membrane covering of the miniaturized, free electron laser.

FIG. 3 shows another exemplary embodiment, where two membrane windows 14 are provided in covering chip 17. As in FIG. 2, covering chip 17 may be insulated from the electrodes and the electrode connections by an insulator of silicon 16. At the same time, this is also constituted of bond region 7 for providing hermetic sealing when encapsulating the arrangement. The construction includes, in turn, the substrate of silicon 11 having a silicon dioxide layer 12. Positioned thereon are field emitter 1, lenses 4, grating 7 and second anode 8. The first anode is the left electrode of electrostatic lens 4. Also positioned, in turn, is grating 7 of metal, out of which the emitted terahertz radiation 15 emerges. Electron beam 10 impinges, without deflection, on second anode 8 having electrical connection 2. The one membrane window 14 is provided with a lens 19 for focusing THz radiation 15. Due to the specially formed covering chip 17, a vacuum 13 may be provided in both chambers 18, 18'; a getter pump, including its material, may be set in operation in second chamber 18' by a one-time activation in response to current flow, to bring the entire volume of both chambers to the required operating pressure.

In a further exemplary variant, ionic getter materials, capable of being activated by the electrical connection, are applied to the chip, next to the Smith-Purcell element. These materials may be used for pumping out the bonded and encapsulated structure. Such a manufacturing, employing additive nanolithography on metal conductor-connection structures, which are prefabricated by electron beam lithography or optical lithography, may include integrated grating structures on an insulating substrate, such as silicon oxide, and a THz underlaid reflector integrated in the grating region, renders possible a component which may be used and set up in any position as a THz radiation source in modular form.

reference symbol list
1 field emitter (tips)
2 electrical terminal or connections
3 controllable voltage source
4 electrostatic lens
5 beam deflector or deflecting plates
6 electrical connections for beam deflectors 7 metal grating
8 second anode
9 electron beam
10 electron beam without deflection
11 silicon (Si)
12 silicon dioxide (SiO2)
13 vacuum
14 membrane window of silicon
15 emitted terahertz radiation
16 insulator or bond region for vacuum-tight encapsulation of the arrangement
17 covering chip
18, 18' chambers
19 lens for focusing the THz radiation

What is claimed is:

1. A miniaturized terahertz radiation source based on the Smith-Purcell effect, comprising:
   a field emitter;
   an electrostatic lens;
   a beam deflector,
   a grating of metal; and
   an anode;
   wherein the field emitter, the electrostatic lens, the beam deflector, the grating of metal and the anode are integrated on a semiconductor chip using one of additive and nanolithographic methods,
   and wherein from a focused electron source, a high-energy bundle of electrons is transmitted at a defined distance over a reflection diffraction grating having transversely disposed grating rods so that in response to an image charge oscillating within a profile of the reflection diffraction grating an electromagnetic wave of a wavelength is emitted and is adjustable as a function of a periodicity of lines and of electron velocity.

2. The miniaturized terahertz radiation source of claim 1, wherein the electron source is a wire constructed using additive nanolithography out of readily conductive material having stabilizing series resistance,
   and wherein the wire is positioned using computer-controlled deposition lithography in at least one of a straight design and a curved design to end freely over a surface of a conductor path structure for any electrical terminals and connections in any tips of the field emitter.

3. The miniaturized terahertz radiation source of claim 2, further comprising a controllable voltage source connected via at least one of an electrical terminals and connections to the electron source to stabilize radiation from the electron source;
   and wherein the electron beam exiting any tips of the field emitter is collected on an electrode of the anode.

4. The miniaturized terahertz radiation source of claim 1, wherein the electron source has a punctiform design and a material, having a low work function and emits electrons at least in response to relatively low voltages, and is deposited on any tips of the field emitter using additive nanolithography.

5. The miniaturized terahertz radiation source of claim 1, wherein the field emitter, the electrostatic lens, the beam deflector, the grating of metal, and the anode, are encapsulated in a vacuum-tight manner by a covering chip.

6. The miniaturized terahertz radiation source of claim 1, wherein the beam deflector is configured to deflect an electron beam in a horizontal direction and a vertical direction, the grating of metal is configured to have an underlaid reflector constructed in integrated fashion, using mix-match technology, on prefabricated metal conductor connection structures having integrated grating structures, on a layer of silicon dioxide of a substrate of silicon, having a THz reflector base in a grating region, all being an imperviously encapsulated structure so as to be transparent to terahertz radiation, and
   the electron beam emerging from the electron source is configured to be focused through an electrostatic lens in the form of a miniaturized wire lenses and is configured to be guided and positioned by integrated deflecting plates in relation to a position of the reflection diffraction grating, and
   a terahertz radiation is configured to be produceable to have an intensity and wavelength which are variable and selectable.

7. The miniaturized terahertz radiation source of claim 6, further comprising ionic getter materials, capable of being activated by an electrode, applied to the semiconductor chip near to a Smith-Purcell element, to produce and maintain a required vacuum in the encapsulated structure.

8. The miniaturized terahertz radiation source of claim 1, wherein to accelerate the electrons behind the electron source, an accelerator grid in form of a free-standing electrode having at least one of two cylindrical rods and a standing wire ring is positioned behind the field electron source; and
   any accelerated electrons arrive in one of round multipole lenses and cylindrical lenses of an electrostatic lens configured subsequent to the accelerator grid, and the electron beam propagates without being deflected over a subsequent reflection diffraction grating at a homogeneous distance to a surface.

9. The miniaturized terahertz radiation source of claim 1, wherein the reflection diffraction grating, having a length of approximately 1 mm to 1 cm and grating periods of approximately 0.5 to 10 $\mu$m, depending on a wavelength of a terahertz radiation to be emitted, is positioned subsequent to the electrostatic lens and the beam deflector which are implemented using additive nanolithography on a metal structure produced using one of electron-beam and optical lithography.

10. The miniaturized terahertz radiation source of claim 1, further comprising: a plurality of electrically isolated diffraction gratings positioned side-by-side in a gratings of metal manner, the plurality of electrically isolated diffraction gratings being configured to be activated in response to selection of various sources for selecting different emitted wavelengths.

11. The miniaturized terahertz radiation source of claim 1, wherein to precisely adjust the wavelength and/or generate a desired fluency spectrum, a voltage is applied between an earth electrode of the electrostatic lens and an electrode acting as the anode to alter the electron velocity along a grating.

12. The miniaturized terahertz radiation source of claim 1, wherein the miniaturized terahertz radiation source is covered by a membrane window etched using a silicon membrane technique and is configured to be evacuated in a vacuum system prior to a bonding operation to a pressure withing a range of $10^{-4}$ Torr, which suffices for an average free path length of one millimeter; and
   further comprising at least one chamber constructed in the vacuum system using thermal bonding as to be able to be at least one of encapsulated and sealed without short-circuiting a voltage supply.

13. The miniaturized terahertz radiation source of claim 1, wherein two membrane windows are positioned next to one another in a covering chip for two chambers; and in one of the two membrane windows a getter pump is set in operation by a onetime activation in response to current flow, and the entire volume of the two chambers receives a required operating pressure.

14. The miniaturized terahertz radiation source of claim 13, wherein the two membrane windows in the covering chip are treated with additionally applied layers to reduce reflection.

15. The miniaturized terahertz radiation source of claim 1, further comprising a terahertz radiation reflector configure underneath a grating region, the terahertz radiation reflector being configured as one of a metal layer and an arrangement of grating rods, and having a defined spacing of a suitable period, having at least one of a magnetic and non-magnetic material to strengthen an intensity of emitted terahertz radiation.

16. The miniaturized terahertz radiation source of claim 15, wherein an intensity fo the radiation source is variable in response to beam guidance over the grating of metal at a defined distance; the radiated intensity is configured to be modulated in response to an application of an alternating current voltage to a deflecting element, by employing an additional deflecting element before the grating of metal.

17. The miniaturized terahertz radiation source of claim 1, wherein the radiation source is configured to generate terahertz radiation as modulated radiation for spectroscopic purposes, and wherein the modulated radiation is generatable by modulating an extraction voltage at any tips of the field emitter.

18. The miniaturized terahertz radiation source of claim 1, further comprising a monochromator on an overlying surface in form of one of a nanometer structure and a micrometer structure that acts on a region; and wherein terahertz radiation is configured generatable with a different wavelength and exits the radiation source in different directions.

19. The miniaturized terahertz radiation source of claim 1, wherein an electrical field is applied between the electrostatic lens for focusing and an end of the grating of metal, an additional electrode of the second anode is positioned at the end of the grating of metal which, through an applied voltage, either accelerates or decelerates flying electrons.

20. The miniaturized terahertz radiation source of claim 1, wherein the grating of metal is subdivided into regions which are disposed in parallel to a beam direction and in which different grating constants are implemented, and wherein a lateral deflecting element for at least one of beam guidance and wavelength selection is mounted around grating regions, and/or groups of field emitters are selectively driven.

21. The miniaturized terahertz radiation source of claim 1, wherein the grating of metal varies in its grating constant transversely to the beam direction so that deflection fields or deflecting plates, which surround the grating of metal all around, are positioned as beam deflectors, such that a beam guidance over the grating of metal is variable in such a way that one region having a different grating constant is selected for emitting a wavelength of terahertz radiation and if the grating of metal has a variable grating constant then the wavelength of the terahertz radiation is continuously adjustable.

22. The miniaturized terahertz radiation source of claim 1, wherein an electrostatic plate is transparent to the terahertz radiation and is positioned to provide intensity control below and above the grating of metal, and enables a position of the electron beam to be varied in an entire grating region.

23. The miniaturized terahertz radiation source of claim 1, wherein the radiation source is designed as a component that is available in modular form and is usable in any spatial situation.

* * * * *

UNITED STATES PATENT AND TRADEMARK OFFICE
CERTIFICATE OF CORRECTION

PATENT NO. : 6,909,104 B1
DATED : June 21, 2005
INVENTOR(S) : Koops et al.

It is certified that error appears in the above-identified patent and that said Letters Patent is hereby corrected as shown below:

<u>Column 9,</u>
Line 18, after "intensity" delete "fo" and insert -- of --.

Signed and Sealed this

Sixth Day of September, 2005

JON W. DUDAS
*Director of the United States Patent and Trademark Office*